US012728750B2

(12) United States Patent
Sakurai et al.

(10) Patent No.: US 12,728,750 B2
(45) Date of Patent: Sep. 8, 2026

(54) SYSTEM, COMPUTER-READABLE STORAGE MEDIUM, AND METHOD

(71) Applicant: HONDA MOTOR CO., LTD., Tokyo (JP)

(72) Inventors: Takayuki Sakurai, Tokyo (JP); Hiroyuki Kanazawa, Tochigi (JP); Qianlong Wang, Tokyo (JP); Atsuya Ishida, Kanagawa (JP)

(73) Assignee: HONDA MOTOR CO., LTD., Tokyo (JP)

( * ) Notice: Subject to any disclaimer, the term of this patent is extended or adjusted under 35 U.S.C. 154(b) by 796 days.

(21) Appl. No.: 18/185,376

(22) Filed: Mar. 17, 2023

(65) Prior Publication Data

US 2023/0302942 A1 Sep. 28, 2023

(30) Foreign Application Priority Data

Mar. 22, 2022 (JP) ................................ 2022-045644

(51) Int. Cl.
*H02J 7/00* (2026.01)
*B60L 50/64* (2019.01)
(Continued)

(52) U.S. Cl.
CPC .............. *B60L 53/62* (2019.02); *B60L 50/64* (2019.02); *B60L 53/53* (2019.02); *B60L 53/63* (2019.02);
(Continued)

(58) Field of Classification Search
CPC .......... B60L 53/62; B60L 53/53; B60L 53/63; B60L 53/67; B60L 53/68; B60L 53/80;
(Continued)

(56) References Cited

U.S. PATENT DOCUMENTS

2008/0281663 A1 11/2008 Hakim
2010/0076825 A1 3/2010 Sato
(Continued)

FOREIGN PATENT DOCUMENTS

JP 2011050240 A 3/2011
JP 2019126230 A 7/2019
(Continued)

OTHER PUBLICATIONS

Office Action issued for counterpart Japanese Application No. 2022-045644, transmitted from the Japanese Patent Office on Sep. 24, 2025 (drafted on Sep. 10, 2025).
(Continued)

*Primary Examiner* — Zixuan Zhou

(57) ABSTRACT

A system includes: a controlling unit for providing an electrical power network with an electrical power resource by performing, a first control for reducing power charging amounts for multiple movable batteries, and/or a second control for increasing power supplying amounts from the multiple movable batteries, in response to a first request for requesting power consumption to be reduced, and a third control for increasing power charging amounts for the multiple movable batteries, and/or a fourth control for reducing a power supplying amount from the multiple movable batteries to outsides, in response to a second request for requesting power consumption to be increased; and an estimating unit for estimating which of the first control, the second control, the third control, or the fourth control can be used by each of the multiple movable batteries to provide with an electrical power resource.

18 Claims, 15 Drawing Sheets

(51) Int. Cl.

| | |
|---|---|
| ***B60L 53/53*** | (2019.01) |
| ***B60L 53/62*** | (2019.01) |
| ***B60L 53/63*** | (2019.01) |
| ***B60L 53/67*** | (2019.01) |
| ***B60L 53/68*** | (2019.01) |
| ***B60L 53/80*** | (2019.01) |
| ***B60L 55/00*** | (2019.01) |
| ***H02J 7/50*** | (2026.01) |
| ***H02J 7/90*** | (2026.01) |

(52) U.S. Cl.

CPC ............... *B60L 53/67* (2019.02); *B60L 53/68* (2019.02); *B60L 53/80* (2019.02); *B60L 55/00* (2019.02); *H02J 7/50* (2026.01); *H02J 7/933* (2026.01); *B60L 2260/54* (2013.01)

(58) Field of Classification Search

CPC ...... B60L 50/64; B60L 55/00; B60L 2260/54; H02J 7/50; H02J 7/933

USPC ............................................ 320/109; 701/22

See application file for complete search history.

(56) References Cited

U.S. PATENT DOCUMENTS

| | | | | |
|---|---|---|---|---|
| 2013/0179061 | A1* | 7/2013 | Gadh | B60L 53/67 701/1 |
| 2014/0100708 | A1 | 4/2014 | Ukita | |
| 2018/0186246 | A1* | 7/2018 | Kudo | B60L 55/00 |
| 2020/0156495 | A1 | 5/2020 | Lindup | |
| 2020/0231058 | A1* | 7/2020 | Hishida | B60L 53/62 |
| 2020/0254896 | A1* | 8/2020 | Lee | B60L 53/68 |
| 2020/0321058 | A1 | 10/2020 | Lee | |
| 2021/0018331 | A1 | 1/2021 | Tsuchiya | |
| 2021/0122260 | A1 | 4/2021 | Kazuno | |
| 2021/0284039 | A1 | 9/2021 | Ando | |
| 2021/0295619 | A1 | 9/2021 | Tsuchiya | |
| 2022/0348107 | A1* | 11/2022 | Hajimiri | B60L 53/80 |

FOREIGN PATENT DOCUMENTS

| | | | |
|---|---|---|---|
| JP | 2020108301 | A | 7/2020 |
| JP | 2021016288 | A | 2/2021 |
| JP | 2021036752 | A | 3/2021 |
| JP | 2021087261 | A | 6/2021 |
| JP | 2021100326 | A | 7/2021 |
| JP | 2021149788 | A | 9/2021 |
| JP | 2021150988 | A | 9/2021 |
| JP | 2021158738 | A | 10/2021 |

OTHER PUBLICATIONS

Office Action issued for counterpart European Application No. 23162787.8, issued by the European Patent Office on Apr. 23, 2024.

Extended European Search Report for counterpart European Application No. 23162787.8, issued by the European Patent Office on Jul. 25, 2023.

* cited by examiner

ALLOCATION TO STATION 30b

ELECTRICAL POWER

PROVISION PERIOD

0

DOWN t1 t2 t3 t4 TIME

ELECTRICAL ENERGY

0

DOWN

☆ ALLOCATION

SYSTEM, COMPUTER-READABLE STORAGE MEDIUM, AND METHOD

The contents of the following Japanese patent application (s) are incorporated herein by reference:

NO. 2022-045644 filed on Mar. 22, 2022.

BACKGROUND

1. Technical Field

The present invention relates to a system, a computer-readable storage medium, and a method.

2. Related Art

Patent Documents 1 to 7 disclose techniques relating to supply-demand adjustment of an electrical grid.

PRIOR ART DOCUMENTS

Patent Document 1: Japanese Patent Application Publication No. 2021-87261

Patent Document 2: Japanese Patent Application Publication No. 2011-50240

Patent Document 3: Japanese Patent Application Publication No. 2021-150988

Patent Document 4: Japanese Patent Application Publication No. 2021-100326

Patent Document 5: Japanese Patent Application Publication No. 2021-149788

Patent Document 6: Japanese Patent Application Publication No. 2020-108301

Patent Document 7: Japanese Patent Application Publication No. 2021-16288

DESCRIPTION OF EXEMPLARY EMBODIMENTS

Hereinafter, embodiments of the present invention will be explained. However, the following embodiments do not limit the invention according to the claims. In addition, some combinations of features explained in the embodiments may be unnecessary for the solving means of the invention.

Figure 1:
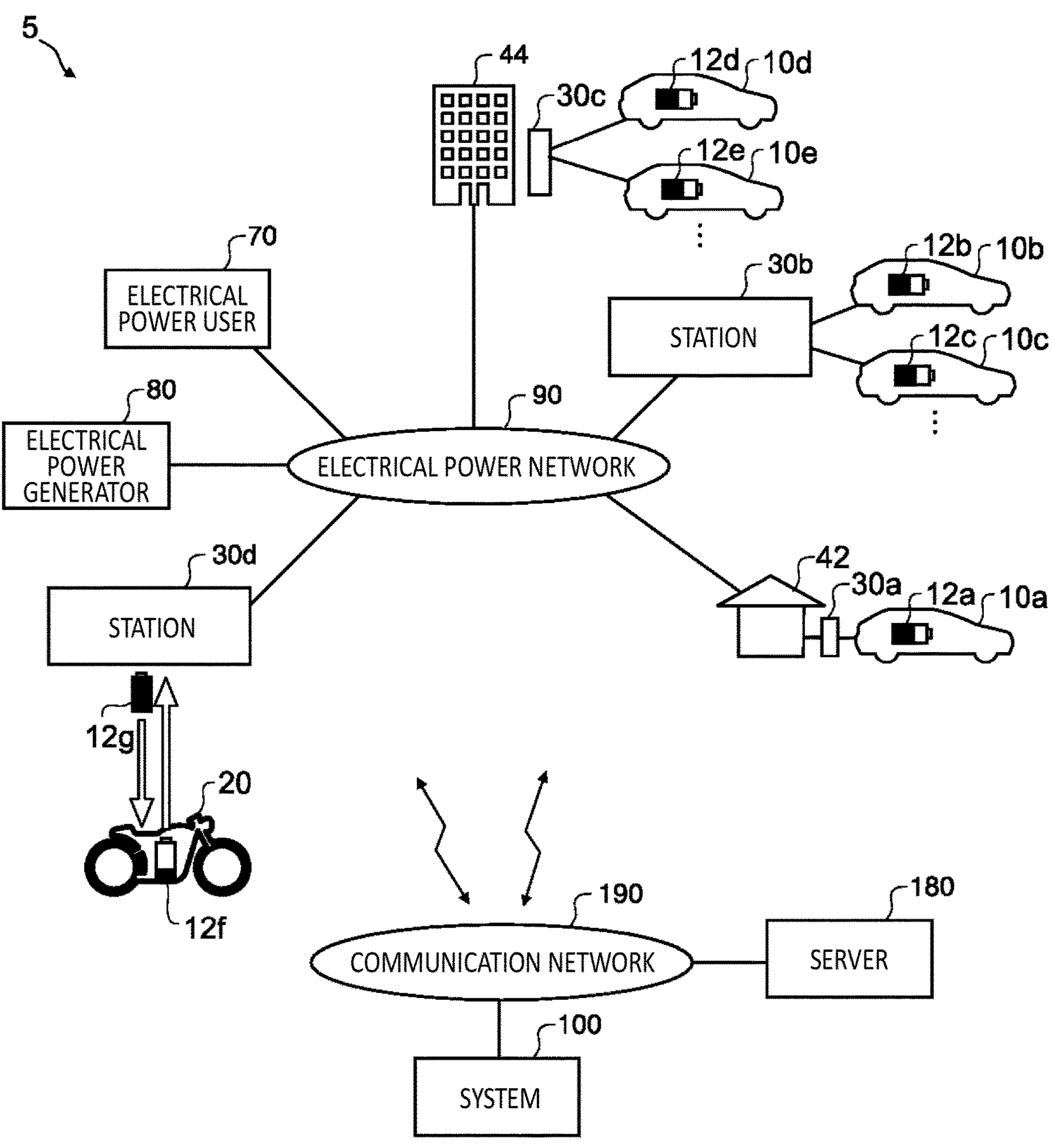
FIG. 1 illustrates an outline of a utilization form of an electrical power system 5 in one embodiment.

FIG. 1 illustrates an outline of a utilization form of an electrical power system 5 in one embodiment. The electrical power system 5 includes a station 30*a*, a station 30*b*, a station 30*c*, and a station 30*d*, an electrical power generator 80, a system 100, a server 180, and a vehicle 10*a*, a vehicle 10*b*, a vehicle 10*c*, a vehicle 10*d*, a vehicle 10*e*, and a vehicle 20.

In the present embodiment, the stations 30*a*, 30*b*, 30*c*, and 30*d* may be collectively referred to as a "station 30". The vehicles 10*a*, 10*b*, 10*c*, 10*d*, and 10*e* may be collectively referred to as a "vehicle 10". The vehicles 10*a*, 10*b*, 10*c*, 10*d*, and 10*e* include a battery 12*a*, a battery 12*b*, a battery 12*c*, a battery 12*d*, and a battery 12*e*, respectively. The batteries 12*a*, 12*b*, 12*c*, 12*d*, and 12*e* may be collectively referred to as a "battery 12".

The system 100 is connected to the server 180 via a communication network 190. The server 180 can communicate with the station 30 via the communication network 190. The system 100 controls the station 30 via the communication network 190. The system 100 communicates with the vehicle 10 via the communication network 190, and obtains various pieces of information on the vehicle 10 such as a travel record of the vehicle 10 or SOC of the battery 12.

The station 30, an electrical power user 70, and the electrical power generator 80 are connected to the electrical power network 90. The electrical power generator 80 includes a power plant operated by an electrical power company, for example. Electrical power generated by the electrical power generator 80 can be supplied to the station 30 and the electrical power user 70 via the electrical power network 90. The electrical power network 90 is an electrical power system, for example.

Each station 30 charges and discharges the battery 12 mounted on the vehicle 10 connected thereto, or put the charging/discharging on hold. The vehicle 10 is an electric vehicle, for example. The battery 12 is a battery for supplying the vehicle 10 with electrical power for travelling. The vehicle 10 may be a privately owned vehicle, a vehicle used by a businessman for his business, a shared car or the like. The battery 12 is one example of a movable battery. The battery 12 can be mounted on the vehicle 10 and be movable thereon.

The station 30*a* is provided at a private house 42, and charges and discharges the battery 12*a* of the vehicle 10*a* connected to the station 30*a*. The station 30*b* is a public charging/discharging station, and charges and discharges batteries 12 mounted on multiple vehicles 10 including the vehicle 10*b* and vehicle 10*c* connected to the station 30*b*. The station 30*c* is a station provided at a facility 44, and charges and discharges batteries 12 mounted on multiple vehicles 10 including the vehicle 10*d* and vehicle 10*e* connected to the station 30*c*.

The station 30*d* holds multiple batteries available to be mounted on vehicles 20, and charges and discharges the multiple batteries held therein. The vehicles 20 are electric motorcycles, for example. A battery 12*f* used by the vehicle 20 is exchanged at the station 30*d*. By way of example, the battery 12*f* used for travel of the vehicle 20 is exchanged for a battery 12*g* charged at the station 30*d*, which is then installed on the vehicle 20. The battery 12*f* and battery 12*g* are examples of movable batteries. The battery 12*f* and battery 12*g* can be movable by being mounted on the vehicles 20. The battery 12*f* and battery 12*g* can also be movable by being carried by one's hand.

Each station 30 can charge the battery 12 with electrical power supplied by the electrical power network 90. The station 30 can discharge the battery 12 and thereby supply the electrical power network 90 with power.

Each station 30 charges and discharges the battery 12 according to control of the system 100. For example, when the electrical power network 90 has insufficient power, the system 100 can cause electrical power to be supplied to the electrical power network 90 by causing the station 30 to discharge the battery 12. When the electrical power network 90 has surplus power, the system 100 can cause the surplus power of the electrical power network 90 to be reduced by causing the station 30 to charge a battery. The system 100 can provide a primary adjusting capability, a secondary adjusting capability, and a tertiary adjusting capability for the electrical power network 90 by using the station 30. As above, the system 100 can collectively manage multiple batteries 12 as an electrical power resource for the electrical power network 90.

The server 180 is used by an electricity aggregator, for example. The server 180 conducts electrical power trading in an electricity market. The system 100 can provide the server 180 with the batteries 12 managed as the electrical power resource. The system 100 controls charging/discharging of a battery, which is performed by the station 30, and provides the electrical power network 90 with an amount of electrical power contracted by the server 180. For example, in response to a demand from the server 180, the system 100 controls charging/discharging of the battery 12 which is performed by the station 30, and provides an amount of electrical power depending on the demand.

Figure 2:
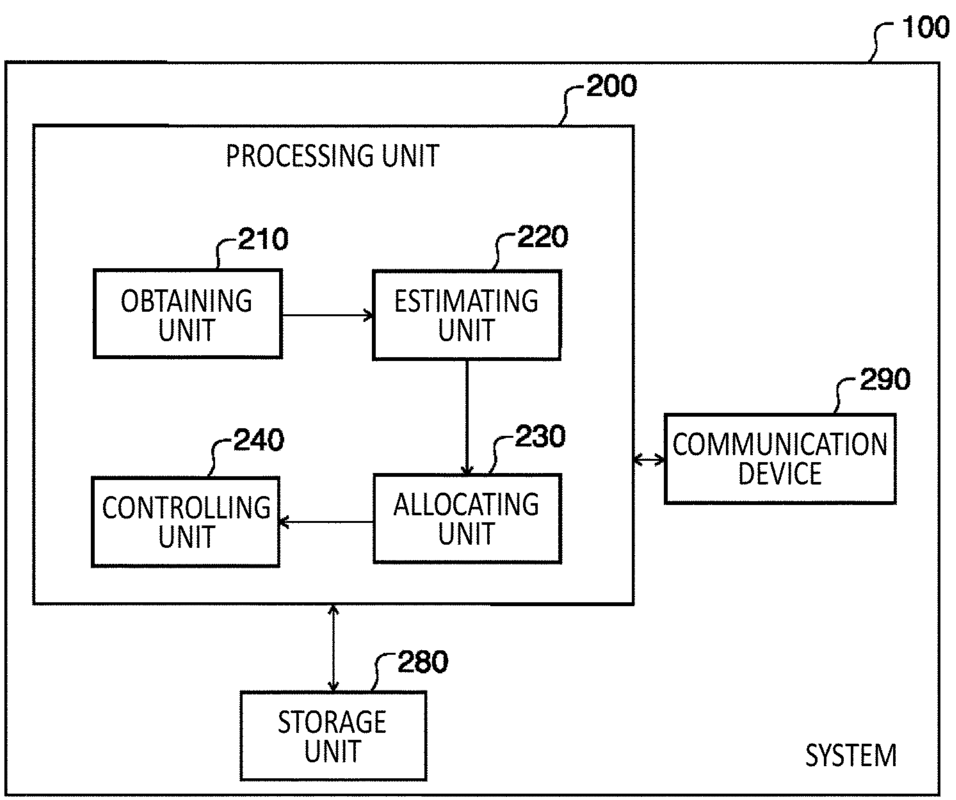
FIG. 2 illustrates one example of a system configuration of a system 100.

FIG. 2 illustrates one example of a system configuration of the system 100. The system 100 includes a processing unit 200, a storage unit 280, and a communication device 290.

The processing unit 200 controls the communication device 290. The communication device 290 performs communication between the station 30*a* and the server 180. The processing unit 200 is embodied as an arithmetic processing device including a processor. Each storage unit 280 is embodied including a non-volatile storage medium. The processing unit 200 performs processing by using information stored in the storage unit 280. The processing unit 200 may be embodied as a microcomputer including a CPU, ROM, RAM, I/O, bus, and the like. The system 100 may be embodied as a computer.

In the present embodiment, it is assumed that the system 100 is embodied as a single computer. However, the system 100 may be embodied as multiple computers in another embodiment. At least a part of functions of the system 100 may be performed by one or more servers such as a cloud server.

The processing unit 200 includes an obtaining unit 210, an estimating unit 220, an allocating unit 230, and a controlling unit 240.

The obtaining unit 210 obtains a travel record of the vehicle 10, and a charging/discharging history of the battery 12. The obtaining unit 210 may obtain the travel record transmitted from the vehicle 10 to the system 100. The travel record of the vehicle 10 may contain information in which a location of the vehicle 10, and SOC and a date and time of the battery 12 are associated. The obtaining unit 210 may obtain the charging/discharging history transmitted from the vehicle 10 to the system 100. The obtaining unit 210 may also obtain a charging/discharging history of the battery 12 transmitted from the station 30. The charging/discharging history may contain information in which a charging/discharging amount and a date and time of the battery 12 are associated. The obtaining unit 210 may obtain information representing a current state of the vehicle 10. The current state of the vehicle 10 may include a current location of the vehicle 10, a current SOC of the battery 12, and the like. The estimating unit 220, allocating unit 230, and controlling unit 240 may perform processing based on the information obtained by the obtaining unit 210.

The system 100 controls charging of the battery 12, and power supply from the battery 12 to an outside. The controlling unit 240 provides the electrical power network 90 with an electrical power resource by performing: at least one of a first control for reducing a power charging amount for the battery 12, or a second control for increasing a power supplying amount from the battery 12, in response to a first request for requesting power consumption to be reduced; and at least one of a third control for increasing a power charging amount for the battery 12, or a fourth control for reducing a power supplying amount from the battery 12 to an outside, in response to a second request for requesting power consumption to be increased. The electrical power resource may be electrical power or electrical energy. Providing the electrical power network 90 with the electrical power resource does not only mean supplying the electrical power network 90 with electrical power, but also includes increasing electrical power demand of the electrical power network 90, and reducing electrical power demand of the electrical power network 90.

The estimating unit 220 estimates, based on a predicted usage situation of the battery 12, which of the first control, second control, third control, or fourth control can be used by each battery 12 to provide the electrical power network 90 with the electrical power resource. For example, the estimating unit 220 estimates, based on the predicted usage situation of the battery 12, an amount of electrical power resources that can be provided to the electrical power network 90 by each battery 12 by using each of the first control, second control, third control, and fourth control.

The estimating unit 220 may estimate, based on a predicted usage situation of the battery 12, an amount of electrical power resources that can be provided to the electrical power network 90 by each battery 12 by using each of the first control, the second control, the third control, and the fourth control in each of multiple timeframes in the future. The estimating unit 220 may estimate, based on a target value of consumption power to be consumed by the battery 12 in every timeframe in the future, and a prediction of a charging/discharging amount of the battery 12 in the future, an electrical power resource required to be provided to the electrical power network 90 in each of multiple timeframes in the future.

The predicted usage situation of the battery 12 includes a timeframe in which the battery 12 is predicted to be used, for example. The predicted usage situation of the battery 12 may also include a predicted charging state of the battery 12. The estimating unit 220 may estimate the predicted usage situation of the battery 12 based on a usage history of the battery 12 in the past, and a usage plan of the battery 12 in the future.

The predicted usage situation of the battery 12 may include a timing at which the battery 12 is predicted to be charged or discharged. For the timing at which the battery 12 is predicted to be charged or discharged in a period in which the electrical power resource contracted in the electricity market should be provided to the electrical power network 90, the estimating unit 220 estimates an amount of electrical power resources available to be provided to the electrical power network 90 by changing the timing of the charging or discharging of the battery 12. Estimating in this way may permit the estimating unit 220 to estimate the amount of electrical power resources that can be provided to the electrical power network 90 by each battery 12 by using each of the first control, second control, third control and fourth control.

The estimating unit 220 may allocate, based on an amount of electrical power resources available to be provided to the electrical power network 90 by each battery 12, and an amount of electrical power resources required to be provided to the electrical power network 90, by which of the first control, second control, third control, or fourth control, the electrical power resource is provided from the battery 12 to the electrical power network 90 in each timeframe within a period in which the electrical power resource contracted in the electricity market should be provided to the electrical power network 90. The controlling unit 240 may perform: at least one of the first control or the second control, in response to a first request being received within the period in which the electrical power resource should be provided to the electrical power network 90 and based on the amount of electrical power resources estimated by the estimating unit 220 as being available to be provided to the electrical power network 90; and at least one of the third control or the fourth control, in response to a second request being received within the period in which the electrical power resource should be provided to the electrical power network 90 and based on the amount of electrical power resources estimated by the estimating unit 220 as being available to be provided to the electrical power network 90.

The controlling unit 240 may perform at least one of: the first control or the second control, in response to the first request being received within the period in which the electrical power resource should be provided to the electrical power network 90 and based on the amount of electrical power resources estimated by the estimating unit 220 as being available to be provided to the electrical power network 90; and at least one of the third control or the fourth control, in response to the second request being received within the period in which the electrical power resource should be provided to the electrical power network 90 and based on the amount of electrical power resources estimated by the estimating unit 220 as being available to be provided to the electrical power network 90.

The allocating unit 230 allocates, based on an amount of electrical power resources available to be provided to the electrical power network 90 by each battery 12, and an amount of electrical power resources required to be provided to the electrical power network 90, by which of the first control, second control, third control, or fourth control, each battery 12 provides the electrical power network 90 with the electrical power resource in each of multiple timeframes in a future. For example, the allocating unit 230 may allocate an amount of electrical power resources to be provided to the electrical power network 90 by each battery 12 by using any of the first control, second control, third control, and fourth control in each of the multiple timeframes in the future.

The allocating unit 230 may preferentially allocate, when allocating whether each battery 12 provides the electrical power network 90 with an electrical power resource, the first control over the second control, and the fourth control over the third control. The allocating unit 230 may allocate, so as to bring a change in electrical charging power or discharging power of the battery 12 to be equal to or less than a predefined value, by which of the first control, second control, third control, or fourth control, each battery 12 provides the electrical power network 90 with the electrical power resource in each of the multiple timeframes in a future.

Figure 3:
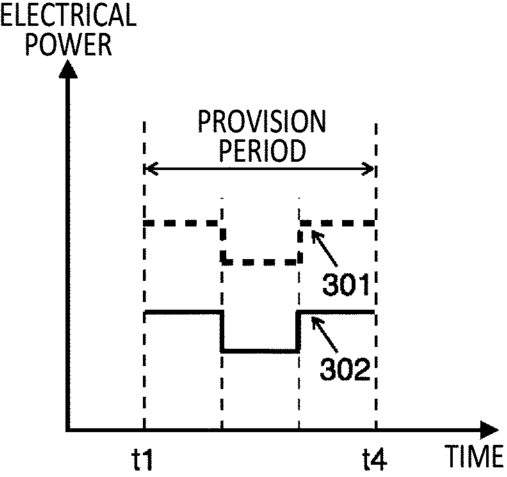
FIG. 3 is a graph schematically showing predicted electrical power 301 predicted to be consumed in a provision period, and a target electrical power 302.

FIG. 3 is a graph schematically showing predicted electrical power 301 predicted to be consumed in a provision period, and a target electrical power 302. In the present embodiment, the "provision period" refers to a period in which electrical energy contracted in the electricity market should be provided. Provision periods shown from FIG. 3 to FIG. 12 are periods from time t1 to time t4.

The predicted electrical power 301 is an expected value of electrical power demand generated under management of the system 100. For example, the predicted electrical power 301 is a reference value of electrical power demand in every thirty minutes, which is used when trading in the electricity market. The target electrical power 302 is defined by subtracting electrical energy contracted in the electricity market from the predicted electrical power 301. The target electrical power 302 is consumption power that should be maintainable by the system 100 in order to ensure that the electrical power network 90 is provided with the electrical energy contracted in the electricity market.

Figure 4:
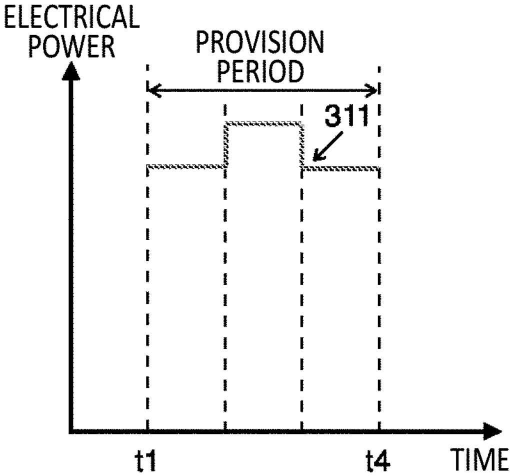
FIG. 4 is a graph schematically showing estimated electrical power 311 in a provision period.

FIG. 4 is a graph schematically showing an estimated electrical power 311 in a provision period. The estimated electrical power 311 represents an estimation value of consumption power consumed by charging of the battery 12, which is controlled by the system 100. The estimated electrical power 311 may be estimated based on a charging plan of the battery 12 in the provision period in the future, prediction of vehicles 10 which enters or leaves the station 30, a history of charging/discharging amount of the battery 12 in every timeframe in the past, and the like. The estimated electrical power 311 is estimated by the estimating unit 220.

Figure 5:
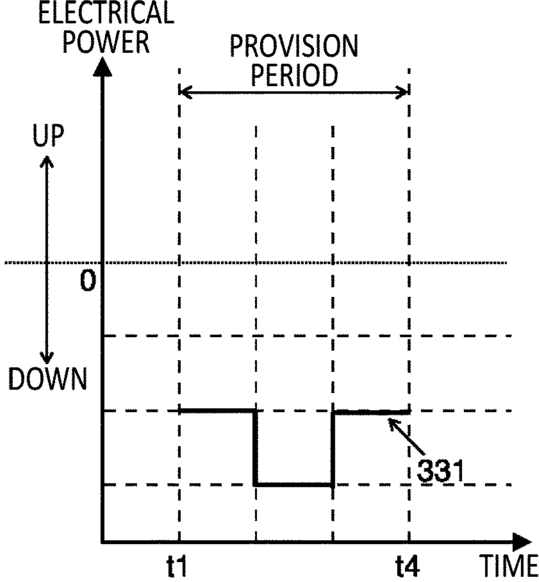
FIG. 5 is a graph schematically showing required electrical power 331 required for the system 100 to secure in a provision period.

FIG. 5 is a graph schematically showing a required electrical power 331 required for the system 100 to secure in the provision period. The required electrical power 331 is calculated by subtracting the estimated electrical power 311 from the target electrical power 302. In FIG. 5, a vertical axis shows difference in electrical power. If a required electrical power is less than zero such as the required electrical power 331 shown in FIG. 5, it is indicated that consumption power may need to be reduced in response to down demand. If a required electrical power is more than zero, it is indicated that consumption power may need to be increased in response to an up demand.

The controlling unit 240 can provide the electrical power network 90 with electrical energy contracted in the electricity market in a provision period by adjusting a charging/ discharging plan of the battery 12 in the future so that the required electrical power 331 can be provided.

The controlling unit 240 performs, if down demand for reducing electrical power demand, which is issued by the server 180 in a period where the required electrical power is less than zero is received, either the first control or the second control in response to the down demand. In the first control, electrical power consumed by charging the battery 12 is reduced, and in the second control, overall consumption power is reduced by discharging the battery 12 and supplying power to an outside of the vehicle 10. The controlling unit 240 performs, if up demand for increasing electrical power demand, which is issued by the server 180 in a period where the required electrical power is more than zero, is received, either the third control or the fourth control in response to the up demand. In the third control, electrical power consumed for charging the battery 12 is increased, and in the fourth control, overall consumption power is increased by reducing power being discharged from the battery 12 and supplied to an outside of the vehicle 10.

Figure 6:
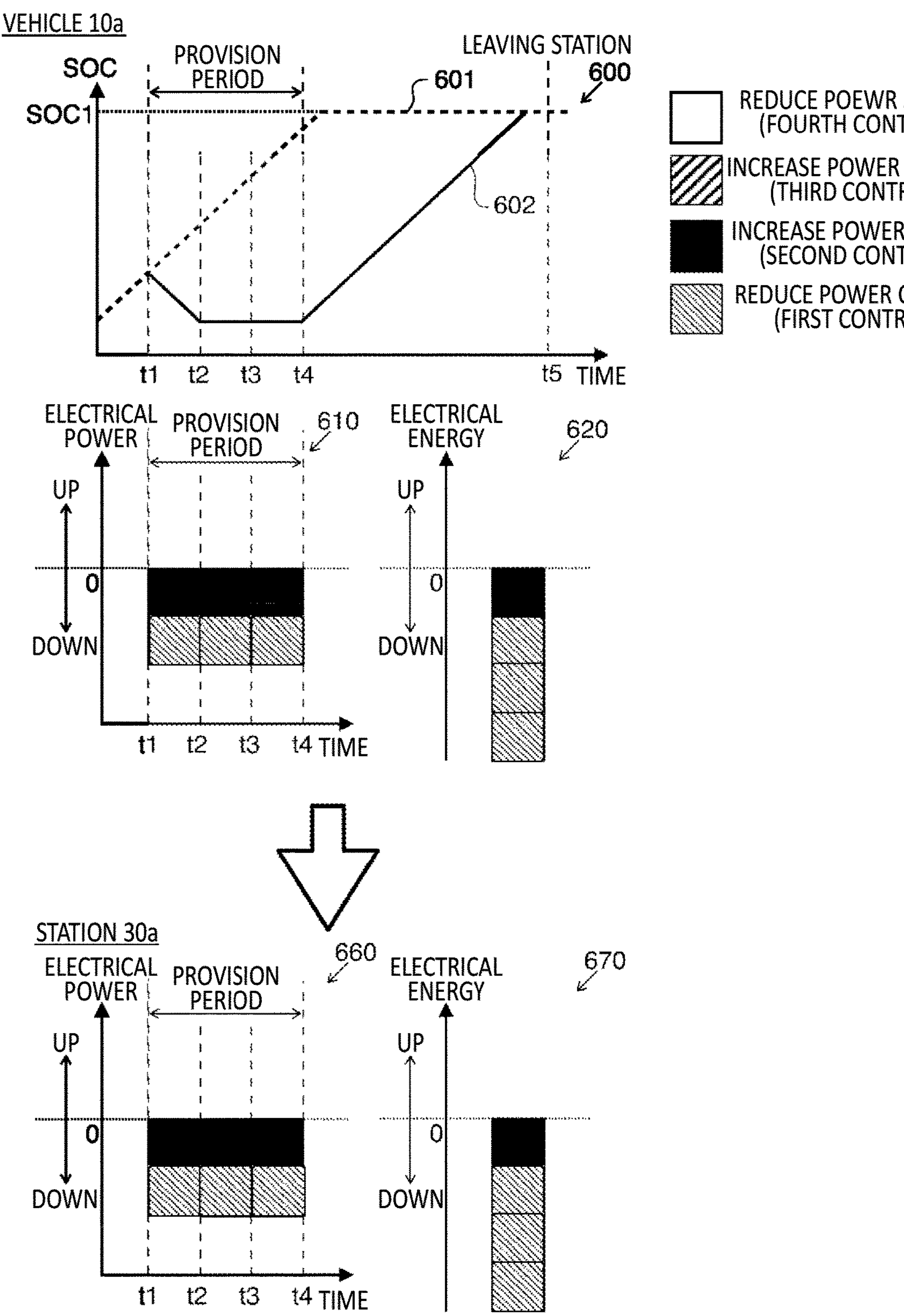
FIG. 6 is a diagram for explaining one example of a method of calculating an electrical power resource available to be provided by a vehicle 10.

FIG. 6 is a diagram for explaining one example of a method of calculating an electrical power resource available to be provided by the vehicle 10. Here, an example case will be shown in which, there is a period of time required for charging the battery 12*a* from finishing time of the provision period until predicted leaving time of the vehicle 10*a* from the station. Explained below in regard to FIGS. 6 to 12 are cases in which, mainly the battery 12 of the vehicle 10 provides the electrical power resource to the electrical power network 90.

A line 601 of a graph 600 shows change in SOC over time based on a plan of charging/discharging the battery 12*a* of the vehicle 10*a*. A line 602 of the graph 600 shows one example of the change in SOC of the battery 12*a* over time when the plan of charging/discharging has been modified in order to provide the electrical power resource within the provision period.

The first control for not causing the battery 12*a* to be charged can be performed in all timeframes from time t1 to time t4. The second control for discharging the battery 12*a* and supplying power to an outside of the vehicle 10 can be performed in any timeframe from time t1 to time t4, as long as SOC is not excessively reduced. For example, SOC change shown with the line 602 represents a case in which the second control is performed from time t1 to time t2 while performing the first control in all timeframes from time t1 to time t4. When adapting to the case shown in FIG. 5 in which the down demand in a timeframe from time t2 to time t3 is especially large, the second control may be performed from time t2 to time t3 (which is omitted from illustration). Next, by starting to charge the battery 12*a* from time t4, the battery 12*a* can be charged until its SOC meets a target SOC1 before predicted leaving time t5 of the vehicle 10*a* from the station.

A graph 610 shows electrical power available to be provided from the battery 12*a* in each timeframe. As described above, reducing the power charging amount for the battery 12*a* by the first control can be executed in all timeframes from time t1 to time t4. The second control can be performed in any timeframe from time t1 to time t4. However, in this example, it is apparent from the line 602 that there is one timeframe available for executing the second control. As represented with square frames in the graph 610, the first control can be selected in all of three frames, and the second control can be selected in one of the three frames. In timeframes corresponding to these frames, electrical power for serving the down demand can be provided.

A graph 620 shows electrical energy available to be provided from the battery 12*a*. As described above, since the first control can be executed in all timeframes from time t1 to time t4, it can be represented with electrical power resources of three timeframes. The second control in the case of this example is represented with an electrical power resource of one timeframe.

A graph 660 shows electrical power available to be provided from the station 30*a* in each timeframe. The graph 670 shows electrical energy available to be provided from the station 30*a*. Because the station 30*a* can only be connected to one vehicle 10*a*, the graph 660 is identical to the graph 610, and the graph 670 is identical to the graph 620.

Figure 7:
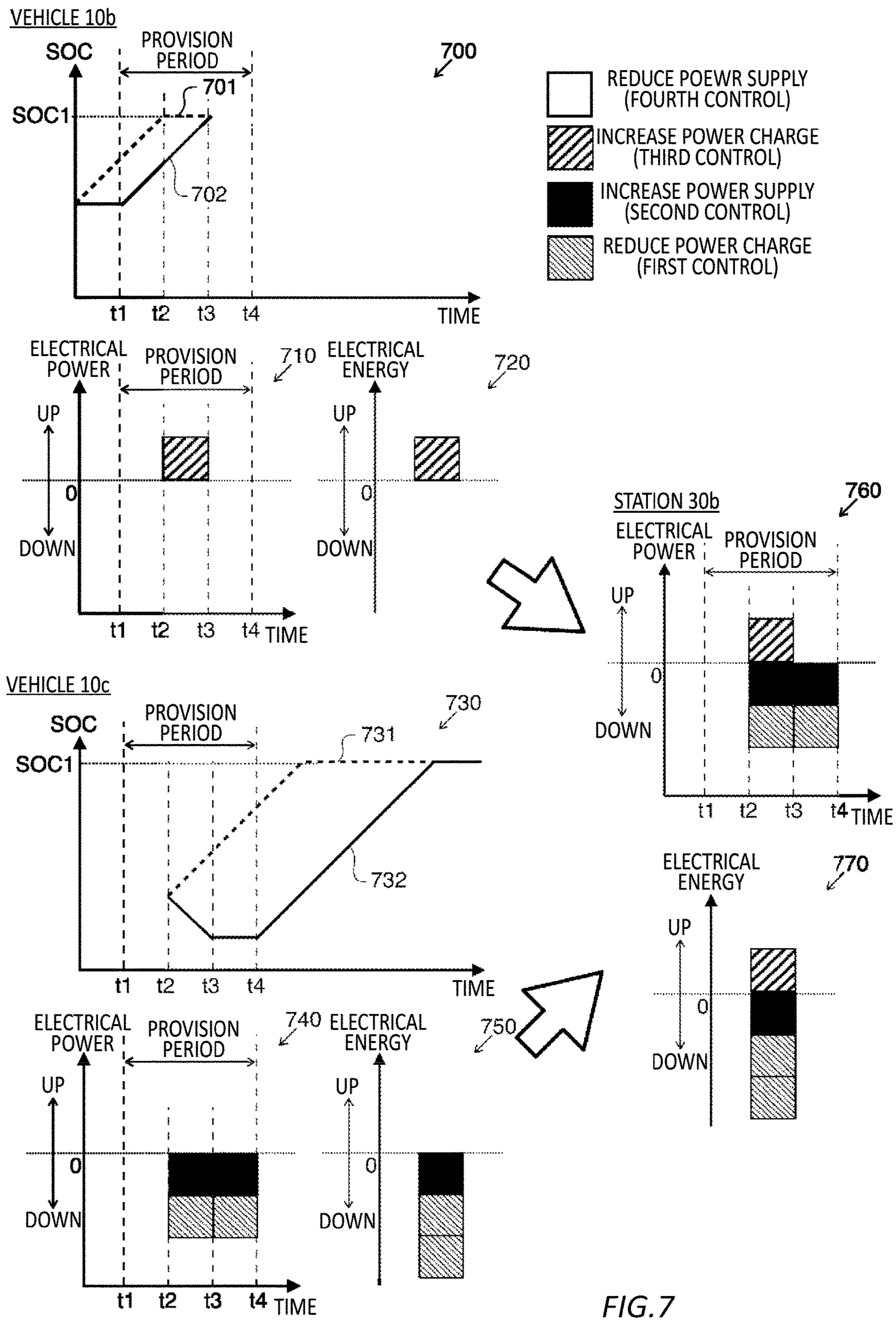
FIG. 7 is a diagram for explaining another example of the method of calculating an electrical power resource available to be provided by the vehicle 10.

FIG. 7 is a diagram for explaining another example of the method of calculating an electrical power resource available to be provided by the vehicle 10. Here, a case will be shown in which, the vehicle 10*b* is predicted to leave from the station 30*b* at time t3 during the provision period, and the vehicle 10*c* is predicted to enter the station 30*b* at time t2 during the provision period.

A line 701 of a graph 700 shows change in SOC over time based on a plan of charging/discharging the battery 12*b* of the vehicle 10*b*. A line 702 of the graph 700 shows the change in SOC of the battery 12*b* over time when the plan of charging/discharging has been modified in order to provide the electrical power resource within the provision period. Here, it is assumed that in the plan of charging/discharging, charging of the battery 12*b* is scheduled to start before time t1.

Against this, as shown with the line 702, the battery 12*b* is charged by starting the charging of the battery 12*b* from time t1, and performing the third control from time t2 to time t3. In this way, a power charging amount can be increased from time t2 to time t3. Therefore, electrical power for responding to the up demand can be provided from the battery 12*b*.

A graph 710 shows electrical power available to be provided from the battery 12*b* in each timeframe. As described above, by performing the third control from time t2 to time t3, electrical power for responding to the up demand can be provided. Therefore, as shown with the graph 710, by performing the third control, a fixed amount of electrical power for responding to the up demand can be provided.

A graph 720 shows electrical energy available to be provided from the battery 12*b*. As described above, by performing the third control from time t2 to time t3, a fixed amount of electrical energy for responding to the up demand can be provided from the battery 12*b*.

A line 731 of a graph 730 shows change in SOC over time based on a plan of charging/discharging the battery 12*c* of the vehicle 10*c*. A line 732 of the graph 730 shows change in SOC of the battery 12*c* over time when the plan of charging/discharging has been modified in order to provide the electrical power resource within the provision period. Here, it is assumed that in the plan of charging/discharging, charging the battery 12*b* is scheduled to start from entering time t2 of the vehicle 10*c* into the station.

Against this, as shown with the line 732, by performing the second control for discharging the battery 12*c* and supplying power to an outside of the vehicle 10 while performing the first control for not charging the battery 12*c* from time t2 to time t3, electrical power for responding to the down demand can be provided from the battery 12*c* from time t2 to time t3. By performing the first control for not charging the battery 12*c* from the following time t3 to time t4, electrical power for responding to the down demand can be provided from time t3 to time t4. Next, by starting the charging of the battery 12*c* from time t4, the battery 12*c* of the vehicle 10*c* can be rapidly charged until its SOC meets a target SOC1.

A graph 740 shows electrical power available to be provided from the battery 12*c* in each timeframe. By performing the second control from time t2 to time t3 as described above, electrical power for responding to the down demand can be provided. Similarly, the second control can be performed from time t3 to time t4. As above, the second control can be performed in any fixed period from time t2 to time t4. A graph 740 illustrates an example of timeframes in which the second control can be performed. Further, by reducing a power charging amount for the battery 12*c* from time t2 to time t4 by using the first control as described above, electrical power for responding to the down demand can be provided as compared with the plan of charging/discharging shown with the line 731.

A graph 750 shows electrical energy available to be provided from the battery 12*c*. By performing the second control in a fixed period from time t2 to time t4 as described above, a fixed amount of electrical energy for responding to the down demand can be provided. In addition, by performing the first control from time t2 to time t4 as described above, electrical energy for responding to the down demand can be provided as shown with graph 750. As shown with the graph 750, the electrical energy available to be provided by performing the first control is electrical energy obtained by integrating electrical charging power that is reduced from time t2 to time t4.

A graph 760 shows electrical power available to be provided from the station 30*b* in each timeframe. A graph 770 shows electrical energy available to be provided from the station 30*b*. The graph 760 is obtained by adding the graph 710 to the graph 740. The graph 770 is obtained by adding the graph 720 to the graph 750.

Figure 8:
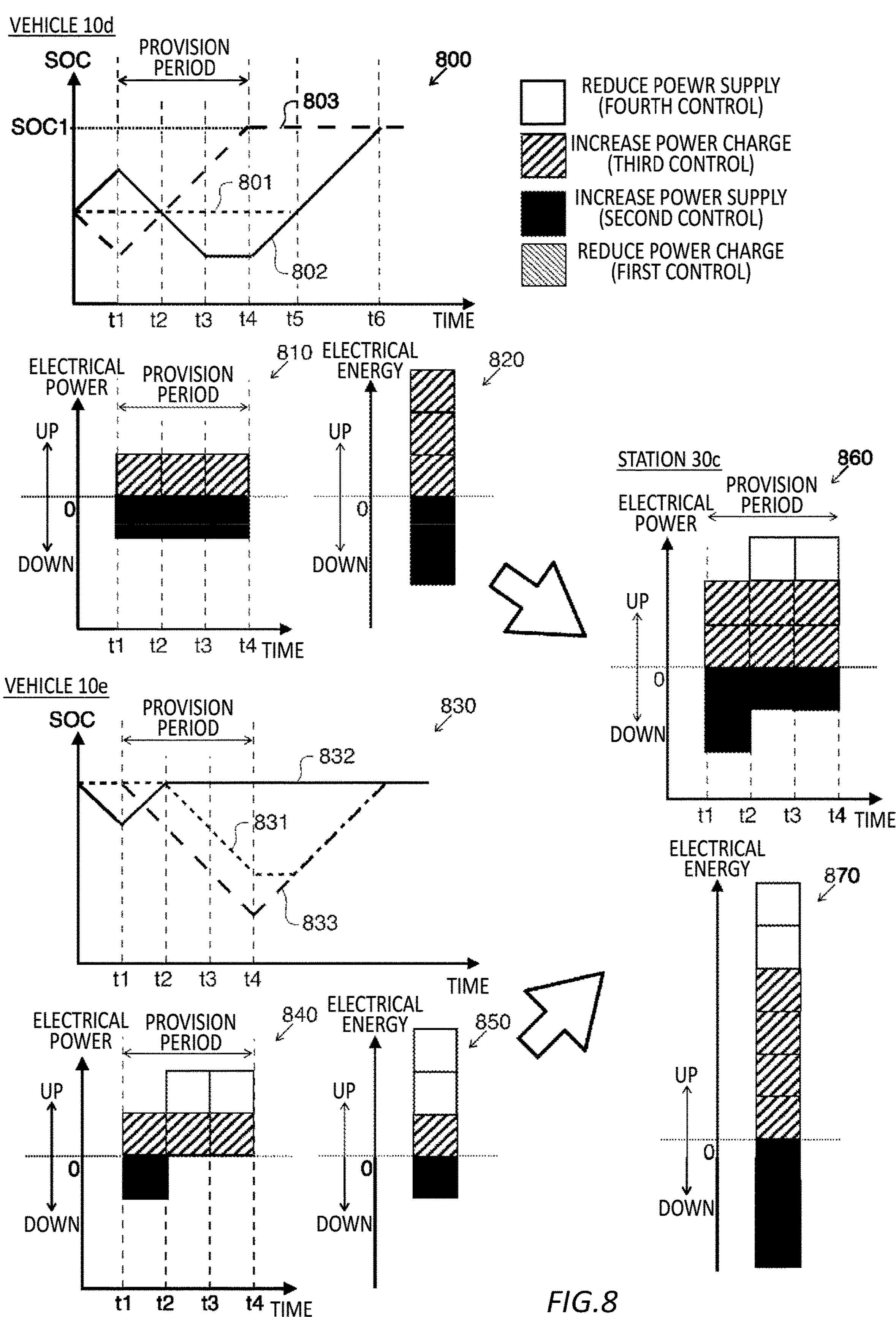
FIG. 8 is a diagram for explaining yet another example of the method of calculating an electrical power resource available to be provided by the vehicle 10.

FIG. 8 is a diagram for explaining another example of the method of calculating an electrical power resource available to be provided by the vehicle 10. Here, it is assumed that there is no schedule of charging/discharging the battery 12*d* of the vehicle 10*d* within the provision period, and there is a schedule of performing timer charging on the battery 12*d* from time t5 to time t6. It is assumed that the vehicle 10*e* is scheduled to supply the facility 44 with power from time t2 to time t4.

A line 801 of a graph 800 shows change in SOC over time based on a plan of charging/discharging the battery 12*d* of the vehicle 10*d*. A line 802 of the graph 800 shows change in SOC of the battery 12*d* over time when the plan of charging/discharging has been modified in order to provide the electrical power resource in response to the first request within the provision period. A line 803 of the graph 800 shows change in SOC of the battery 12*d* over time when the plan of charging/discharging has been modified in order to provide the electrical power resource in response to the second request within the provision period.

As shown with the line 802, charging of the battery 12*d* starts before time t1, and the battery 12*d* is discharged by performing the second control from time t1 to time t3, then no charging/discharging are performed on the battery 12*d* from time t3 to time t4, and charging of the battery 12*d* starts from time t4 when the provision period ends. In this way, a power supplying amount from the battery 12*d* to an outside of the vehicle 10*d* can be increased from time t1 to time t3. Therefore, electrical power for responding to the down demand can be provided from the battery 12*d*.

As shown with the line 803, by starting the discharging of the battery 12*d* before time t1, and performing the third control from time t1 to time t4, the battery 12*d* is charged until its SOC meets a target SOC1. In this way, a power charging amount for the battery 12*d* can be increased from time t1 to time t4. Therefore, electrical power for responding to the up demand can be provided from the battery 12*d*.

A graph 810 shows electrical power available to be provided from the battery 12*d* in each timeframe. If performing the control shown with the line 802 in a way described above, electrical power for responding to the down demand can be provided by performing the second control in a period of two timeframes from time t1 to time t3. The second control can be performed in a period of two timeframes from time t2 to time t4. As above, the second control can be performed in a period of any two timeframes out of three timeframes from time t1 to time t4. If performing the control shown with the line 803, by performing the third control from time t1 to time t4, electrical power for responding to the up demand can be provided. Therefore, as shown with the graph 810, by performing the second control, a fixed amount of electrical power for responding to the down demand can be provided, and also by performing the third control, electrical power for responding to the up demand can be provided.

A graph 820 shows electrical energy available to be provided from the battery 12*d*. By performing the second control in a fixed period from time t1 to time t4 as described above, electrical energy for responding to the down demand can be provided from the battery 12*d*. In addition, by performing the third control from time t1 to time t4, a fixed amount of electrical energy for responding to the up demand can be provided. As shown with the graph 820, the electrical energy available to be provided by performing the third control is electrical energy obtained by integrating electrical charging power that is used from time t1 to time t4. Also, the electrical energy available to be provided by performing the second control is electrical energy obtained by integrating electrical power supplied in the fixed period from time t1 to time t4 for performing the second control.

A line 831 of a graph 830 shows change in SOC over time based on a plan of charging/discharging the battery 12*e* of the vehicle 10*e*. As shown with the line 831, it is scheduled to discharge the battery 12*e* from time t2 to time t4 and supply the facility 44 with electrical power. A line 832 of the graph 830 shows change in SOC of the battery 12*c* over time when the plan of charging/discharging has been modified in order to provide the electrical power resource within the provision period. A line 833 of the graph 830 shows change in SOC of the battery 12*e* over time when the plan of charging/discharging has been modified with a different form in order to provide the electrical power resource within the provision period.

As shown with the line 832, the battery 12*e* is charged by discharging the battery 12*e* before time t1, and executing the third control from time t1 to time t2. In this way, a power charging amount can be increased from time t1 to time t2. Therefore, electrical power for responding to the up demand can be provided from the battery 12*e*. In addition, by performing the fourth control from time t2 to time t4 and thereby not supplying power to the facility 44, electrical power for responding to the up demand can be provided from the battery 12*e*.

By way of control in another form, as shown with the line 833, by discharging the battery 12*e* from time t1 to time t4 and thereby performing the second control from time t1 to time t2, a power supplying amount from the battery 12*e* can be increased. Therefore, electrical power for responding to the down demand can be provided from the battery 12*e*.

A graph 840 shows electrical power available to be provided from the battery 12*e* in each timeframe. As described above, by performing the third control from time t1 to time t2, electrical power for responding to the up demand can be provided. Similarly, the third control can be performed from time t2 to time t3 or from time t3 to time t4. Therefore, the third control can be performing in any fixed period from time t1 to time t4. Therefore, as shown with the graph 840, by performing the third control, a fixed amount of electrical power for responding to the up demand can be provided from time t1 to time t4. Further, by reducing a power supplying amount from the battery 12*e* from time t2 to time t4 by using the fourth control as described above, electrical power for responding to the up demand can be provided as compared with the plan of charging/discharging shown with the line 831.

A graph 850 shows electrical energy available to be provided from the battery 12*e*. By performing the third control in a fixed period from time t1 to time t4 as described above, a fixed amount of electrical energy for responding to the up demand can be provided. In addition, by performing the fourth control from time t2 to time t4 as described above, electrical energy for responding to the up demand can be provided as shown with graph 850. As shown with the graph 850, the electrical energy available to be provided by performing the fourth control is electrical energy obtained by integrating electrical charging power that is reduced from time t2 to time t4. In addition, by performing the second control from time t1 to time t2 as described above, electrical energy for responding to the down demand can be provided.

A graph 860 shows electrical power available to be provided from the station 30*c* in each timeframe. The graph 870 shows electrical energy available to be provided from the station 30*c*. The graph 860 is obtained by adding the graph 810 to the graph 840. The graph 870 is obtained by adding the graph 820 to the graph 850.

Note that, the estimating unit 220 may estimate, based on a travel record of the vehicle 10 in the past and an action plan input by a user, leaving time of the vehicle 10 from the station 30 and entering time of the vehicle 10 into the station 30. The estimating unit 220 may estimate, based on a charging/discharging history of the battery 12 in the past and a travel record of the vehicle 10, SOC of the battery 12 of the vehicle 10 at a time of entering the station and SOC of the battery 12 of the vehicle 10 at a time of leaving the station. The estimating unit 220 may estimate, provided that SOC of the battery 12 of the vehicle 10 at a time of leaving the station can meet a target SOC, electrical power and electrical energy available to be provided by each battery 12.

The obtaining unit 210 may obtain preference information representing whether a user of the vehicle 10 prefers that the battery 12 provides electrical power in response to a demand. The estimating unit 220 may estimate, based on the preference information, electrical power and electrical energy available to be provided by the battery 12. For example, the estimating unit 220 may exclude a battery 12 of a vehicle 10 associated with a user who does not prefer that the battery 12 provides electrical power in response to a demand, from batteries 12 for responding to the demand.

The obtaining unit 210 may obtain specification information on the battery 12 and the station 30. The specification information may include: information representing electrical power available for the battery 12 to charge/discharge; information representing whether discharging from the battery 12 to the vehicle 10 is available; information representing electrical power available for the station 30 to charge/discharge; information representing whether the station 30 can supply power from the battery 12 to the electrical power network 90; and the like. The estimating unit 220 may estimate, based on the specification information and within ranges of specifications of the battery 12 and the station 30, electrical power and electrical energy available to be provided by the battery 12.

The obtaining unit 210 may obtain state information on the battery 12. The state information may include information representing deterioration degree of the battery 12, capacity of the battery 12, and temperature dependence of output power. The estimating unit 220 may estimate, based on the state information on the battery 12, electrical power and electrical energy available to be provided by the battery 12. For example, the estimating unit 220 may preferentially select a battery 12 of which deterioration degree is lower as a battery 12 being available for responding to a demand. The estimating unit 220 may exclude a battery 12 of which deterioration degree is lower than a predefined value from batteries 12 for responding to a demand.

In order to reduce progress of deterioration of the battery 12 and the station 30, which may be caused by responding to a demand, the estimating unit 220 may set restrictions on an upper value and lower value of SOC of the battery 12, and a charging/discharging amount of the battery 12, and estimate electrical power and electrical energy available to be provided by the battery 12. The estimating unit 220 may determine, by taking a financial advantage to a user of the vehicle 10 into account, and thus based on an electricity rate that may be incurred by charging the battery 12 and a reward which can be obtained by the user associated with the vehicle 10 by responding to a demand, whether to cause the battery 12 of the vehicle 10 to respond to the demand. For example, the estimating unit 220 may determine not to cause the battery 12 to respond to the demand when the electricity rate is higher than the reward.

Figure 9:
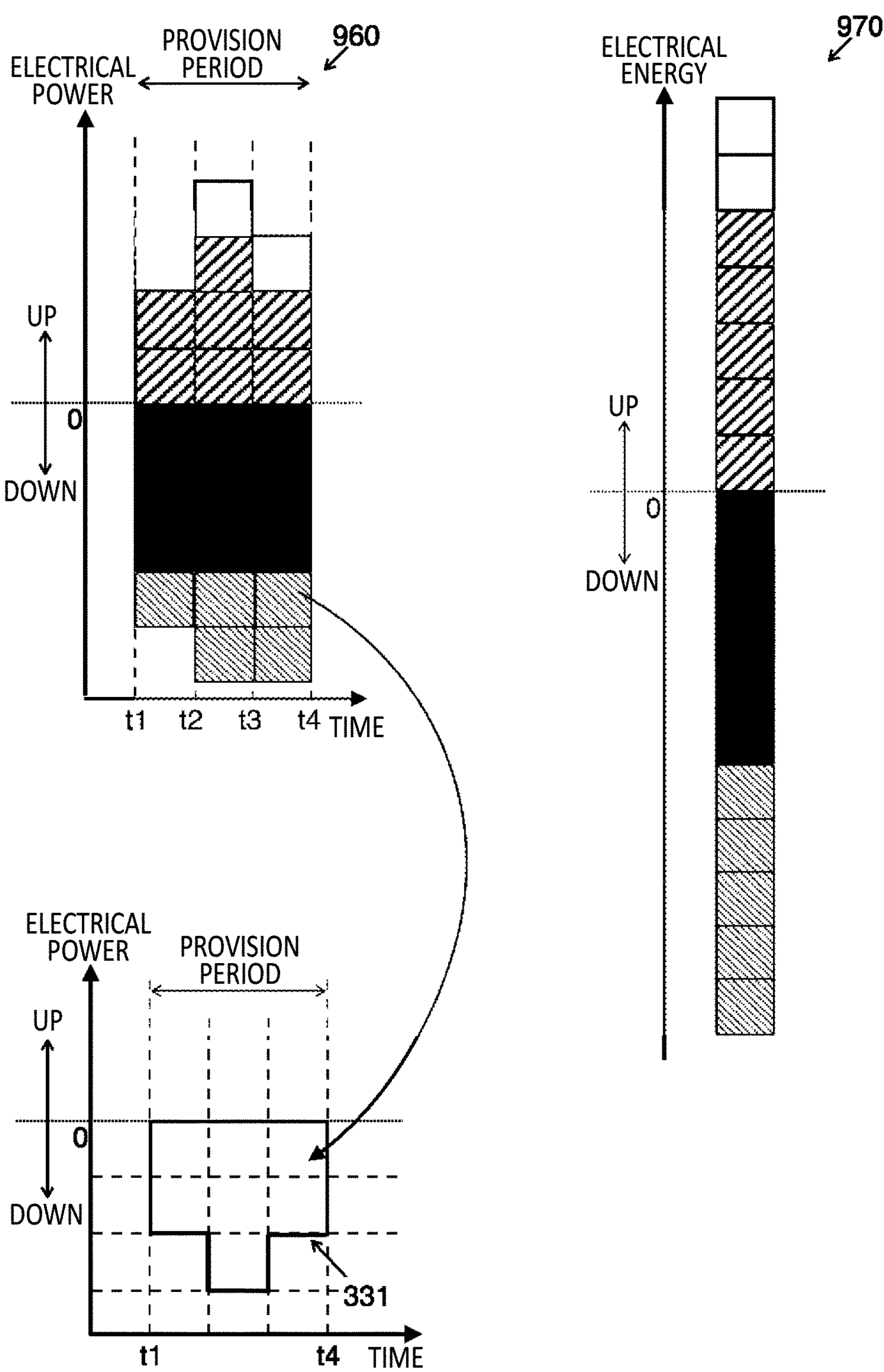
FIG. 9 schematically illustrates total electrical power and a total electrical energy available to be provided by all stations 30.

FIG. 9 schematically illustrates total electrical power and a total electrical energy available to be provided by all stations 30. A graph 960 shows the total electrical power available to be provided from the all stations 30 in each timeframe. A graph 970 shows the total electrical energy available to be provided from a station 30. The graph 960 is obtained by adding the graph 660, graph 760, and graph 860. The graph 970 is obtained by adding the graph 670, graph 870, and graph 870.

The required electrical power 331 in FIG. 5 shows the electrical power required for the system 100 to secure in every timeframe in order to respond to a demand in the provision period. As shown with FIG. 9, the allocating unit 230 allocates the total electrical power available to be provided, which is shown in FIG. 9, to the required electrical power 331 so that the required electrical power 331 becomes available to be provided. Specifically, the allocating unit 230 allocates from which station 30 the required electrical power 331 is provided, and form which battery 12 the required electrical power 331 is provided.

Figure 10:
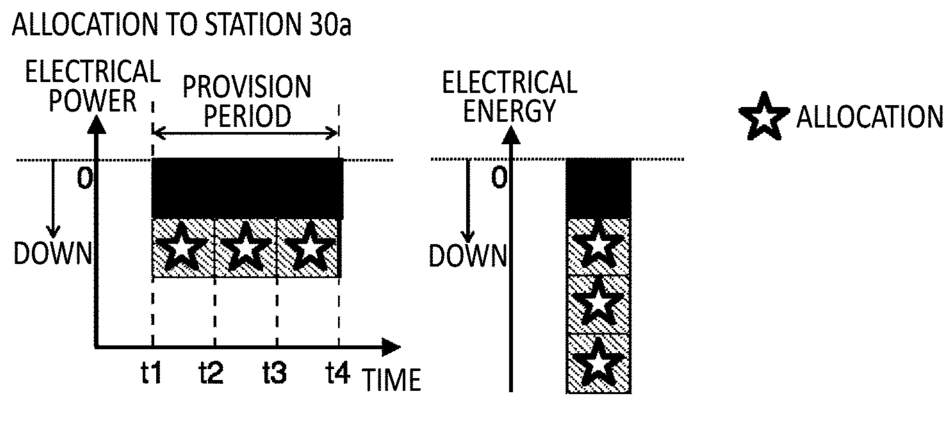
FIG. 10 is a schematic diagram for explaining control for allocating, in response to a demand, electrical power and electrical energy available to be provided, to a station 30*a* and a battery 12*a*.
Figure 10:
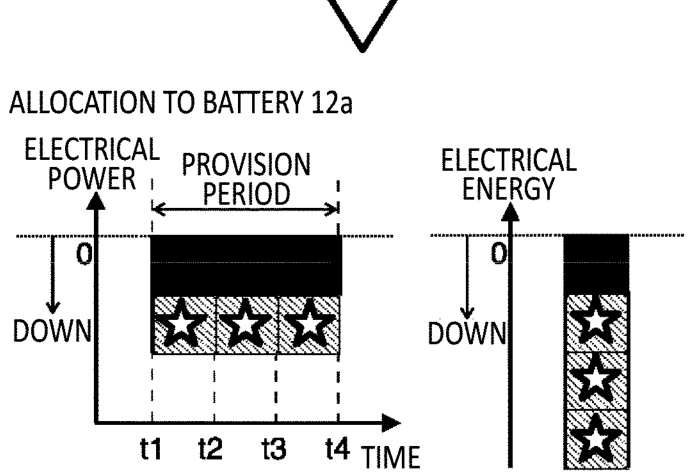
Figure 11:
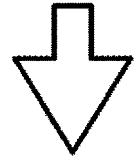
FIG. 11 is a schematic diagram for explaining control for allocating, in response to a demand, electrical power and electrical energy available to be provided, to a station 30*b*, and a battery 12*b* and a battery 12*c*.
Figure 11:
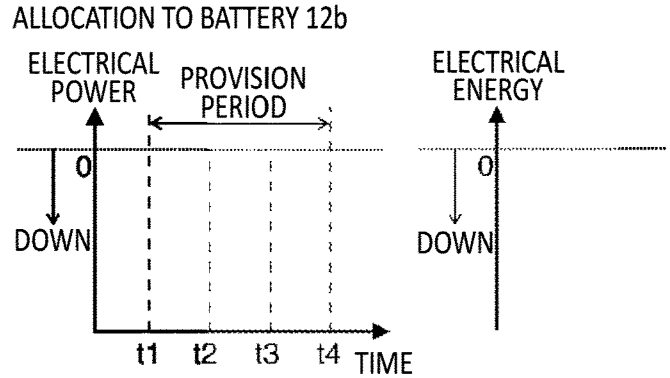
Figure 11:
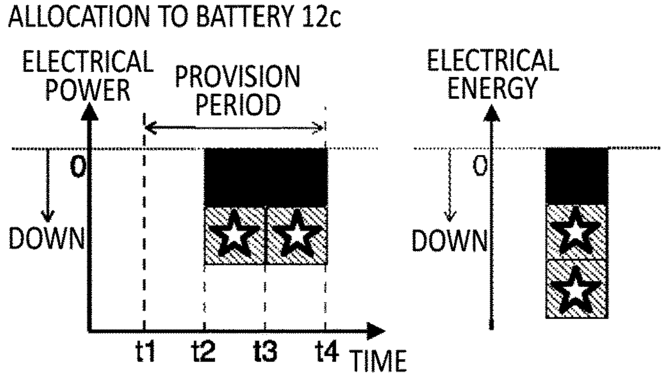
Figure 12:
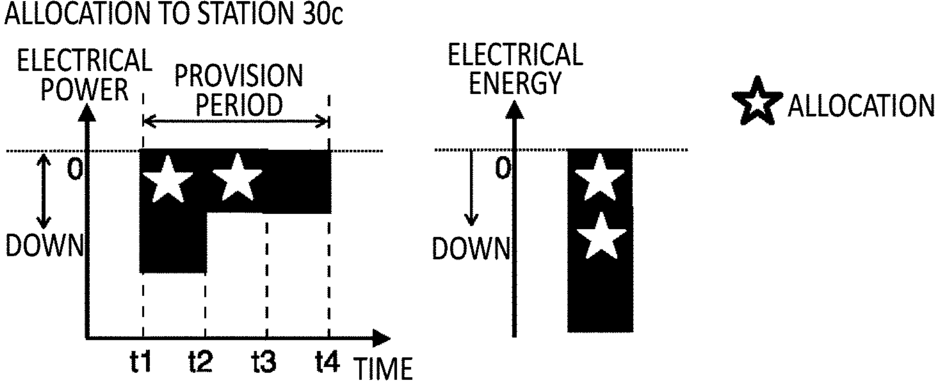
FIG. 12 is a schematic diagram for explaining control for allocating, in response to a demand, electrical power and electrical energy available to be provided, to a station 30*c*, and a battery 12*d* and a battery 12*e*.
Figure 12:
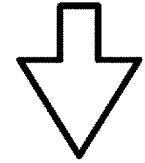
Figure 12:
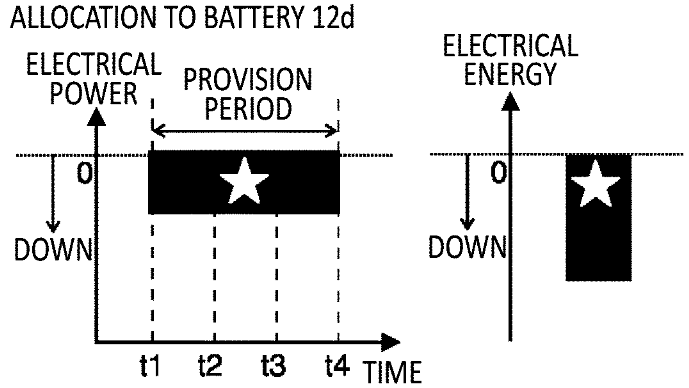
Figure 12:
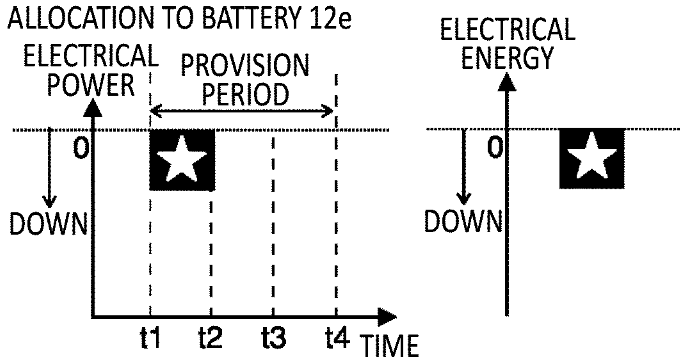

Explained below in regard to FIGS. 10 to 12 is control for allocating, in response to a demand, electrical power and electrical energy available to be provided, to the station 30 and the battery 12. Because responding to the up demand is not required in the example of the required electrical power 331 shown in FIG. 5, the following descriptions in regard to FIGS. 10 to 12 only describe about the down demand.

FIG. 10 is a schematic diagram for explaining control for allocating, in response to a demand, electrical power and electrical energy available to be provided, to the station 30*a* and the battery 12*a*. FIG. 11 is a schematic diagram for explaining control for allocating, in response to a demand, electrical power and electrical energy available to be provided, to the station 30*b*, and the battery 12*b* and battery 12*c*. FIG. 12 is a schematic diagram for explaining control for allocating, in response to a demand, electrical power and electrical energy available to be provided, to the station 30*c*, and the battery 12*d* and battery 12*e*.

The allocating unit 230 allocates from which of the station 30 among the station 30*a*, station 30*b*, or station 30*c*, electrical power for providing required electrical power is provided. In order to reduce deterioration of a battery and a charging device, the allocating unit 230 gives priority to reducing power charging by the first control and reducing power supply by the fourth control over increasing power supply by the second control and increasing charging by the third control. Further, the allocating unit 230 allocates from which station 30 electrical power for providing the required electrical power 331 is provided, in a manner that the providing is performed with 80% or less of electrical energy available to be provided by each station 30. The allocating unit 230 allocates electrical power provided by each battery 12 in every timeframe, in a way that change in electrical charging power and supplying electrical power over time is less than a predefined value.

The allocating unit 230 may allocate, in an order from a timeframe having a least ratio of electrical power available to be supplied for the required electrical power 331, from which station 30 and battery 12 the required electrical power is provided. For example, as shown with FIG. 9, in the timeframe from time t2 to time t3, electrical power of approximately 1.67 times the required electrical power 331 is available to be provided, in the timeframe from time t1 to time t2, electrical power of twice the required electrical power 331 is available to be provided, and in the timeframe from time t3 to time t4, electrical power of 2.5 times the required electrical power 331 is available to be provided. In this case, it may be allocated that from which station 30 and battery 12 the required electrical power is provided in the timeframe from time t2 to time t3, then it may be allocated that from which station 30 and battery 12 the required electrical power is provided in the timeframe from time t1 to time t2, and finally it may be allocated that from which station 30 and battery 12 the required electrical power is provided in the timeframe from time t3 to time t4. The allocating unit 230 may preferentially allocate a station 30 and a battery 12 which can provide a largest amount, as the station 30 and battery 12 from which the required electrical power should be provided.

As shown with FIGS. 10 and 11, total electrical power available to be provided from the station 30*a* by the first control, and total electrical power available to be provided from the station 30*b* by the first control are preferentially allocated. Specifically, total electrical power available to be provided from the battery 12*a* by the first control, and total electrical power available to be provided from the battery 12*c* by the first control are preferentially allocated. Next, the allocating unit 230 allocates a part of electrical power available to be provided from the station 30*c* by the second control. Specifically, a part of electrical power available to be provided from the battery 12*d* by the second control, and a part of electrical power available to be provided from the battery 12*e* by the second control are allocated. In this way, the allocating unit 230 can preferentially allocate electrical power available to be provided by the first control, in a manner that the electrical energy to be allocated from the station 30*a*, station 30*b*, and station 30*c* is composed of 80% or less of their available electrical power.

Explained above in regard to FIGS. 6 to 12 were cases in which, mainly the battery 12 mounted on the vehicle 10 provides the electrical power resource for the electrical power network 90. However, also in a case in which batteries for vehicles 20 including the battery 12*f* and the battery 12*g* provide an electrical power resource for the electrical power network 90, processing similar to the processing for the battery 12 explained in regard to FIGS. 6 to 12 can be performed. For example, electrical power available to be provided for the electrical power network 90 by a battery for a vehicle 20 can be estimated based on: a charging/discharging history of the battery 12 in the past performed by the station 30*d*; SOC of the battery for the vehicle 20 when this battery is returned to the station 30*d*; and a history of exchanging the battery 12 in the station 30*d*, and it can be allocated that by which of the first control, second control, third control, or fourth control of the battery for the vehicle 20 provides electrical power for the electrical power network 90.

Figure 13:
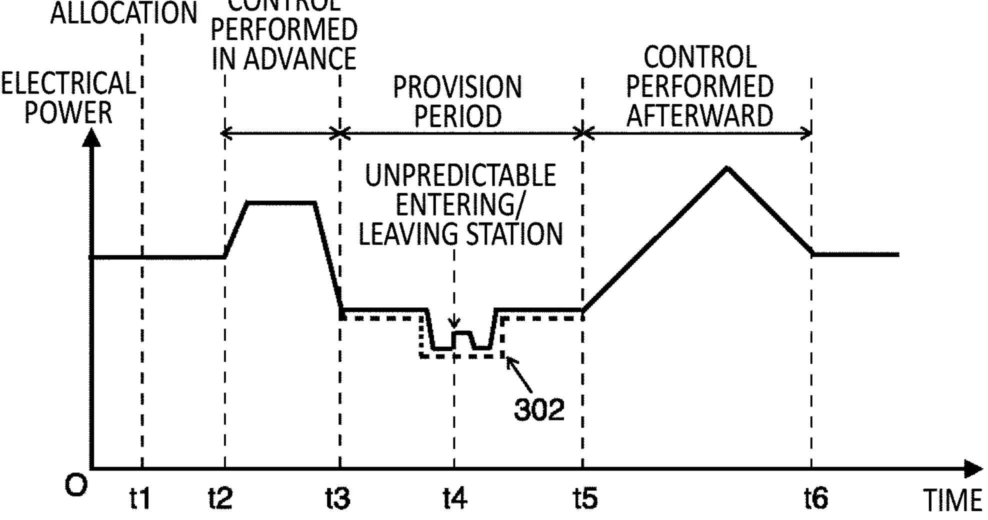
FIG. 13 illustrates one example of change in consumption power over time caused by control of a station 30.

FIG. 13 illustrates one example of change in consumption power over time caused by control of the station 30. In FIG. 13, a provision period is from time t3 to time t5.

At time t1, the allocating unit 230 allocates from which station 30 and battery 12 required electrical power is provided in the provision period. The allocating unit 230 may allocate at a timing prior to starting time of the provision period by a predefined period of time. The allocating unit 230 may allocate, in a day including the provision period, at a predefined time before starting time of the provision period.

At time t2 before the starting time of the provision period, the controlling unit 240 controls charging/discharging of the battery 12 in advance so that required electrical power can be provided from the battery 12 in the provision period. For example, the controlling unit 240 causes, if there is a possibility of reducing consumption power depending on a down demand within the provision period, the battery 12 to be charged in advance. Control of causing the battery 12 to be charged before the starting time of the provision period, such as that shown with the line 802 in FIG. 8, falls within the control performed in advance.

In the provision period, the controlling unit 240 controls charging/discharging of the battery 12 by controlling the station 30 depending on a demand. At this time, the controlling unit 240 controls the charging/discharging of the battery 12 based on a result of allocation executed by the allocating unit 230. If consumption power increases due to a vehicle 10 unpredictably entering or leaving the station at time t4, the controlling unit 240 selects, among batteries 12 not allocated by the allocating unit 230 as a battery 12 for providing required electrical power, a battery 12 that can provide electrical power for serving the increased consumption power, and provides electrical power for serving the increased consumption power by performing the first control or the second control on the selected battery 12.

Once the provision period ends at time t5, the controlling unit 240 controls charging/discharging of the battery 12 in order to recover the required electrical power provided by the battery 12 in the provision period. For example, the controlling unit 240 causes, if the consumption power is reduced in response to a down demand within the provision period, the battery 12 to be charged after the provision period. For example the controlling unit 240 causes, as shown with the line 802 in FIG. 8, the battery 12 to be charged before the starting time of the provision period.

Control of causing the battery 12 to be charged after the provision period, such as that shown with the line 602 in FIG. 6, falls within control performed afterward. At this time, it is desirable that the controlling unit 240 controls charging/discharging of the battery 12 such that change in consumption power over time after the provision period is less than a predefined value.

Figure 14:
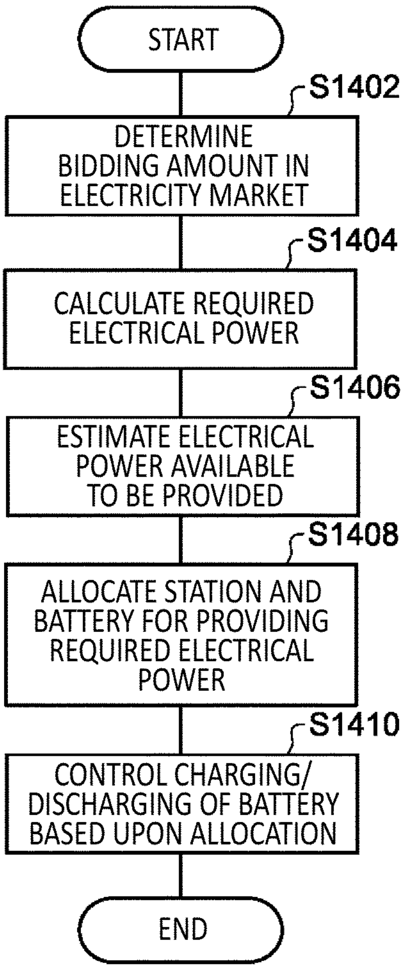
FIG. 14 is a flowchart showing procedures of processing executed by the system 100.

FIG. 14 is a flowchart showing procedures of processing executed by the system 100. In S1402, the estimating unit 220 determines a bidding amount for the electricity market. For example, the estimating unit 220 estimates, by using a prediction model for estimating electrical power and electrical energy available to be provided in response to a demand, the electrical power and the electrical energy available to be provided, and determines the bidding amount based on the estimated electrical power and electrical energy. The prediction model may be generated in advance based on a charging/discharging history of a battery 12 in the past. For example, the prediction model may be generated by machine learning using electrical power and electrical energy available to be provided in every timeframe, which is calculated based on a charging/discharging history of the battery 12 in the past. The prediction model may use a point of time information as an input, and output an estimation value of electrical power and electrical energy available to be provided at a point of time shown with the point of time information that is input. The input for the prediction model may include any one of: a day of the week information; weekday/weekend distinction information; season information; and timeframe information. The input for the prediction model may further include at least one of temperature information or weather information.

In S1404, the estimating unit 220 estimates required electrical power. For example, as explained in regard to FIG. 3, the estimating unit 220 may calculate target electrical power based on electrical power contracted in an electricity market, and estimate the required electrical power from a difference between the target electrical power and an estimated electrical power.

In S1406, electrical power available to be provided by a station 30 and a battery 12 is estimated. For example, the estimating unit 220 estimates, by using the method explained in regard to FIGS. 6 to 8, electrical power and electrical energy available to be provided by a station 30 and each battery 12 by using each of the first control, second control, third control, and fourth control.

In S1408, the allocating unit 230 allocates a station 30 and a battery 12 for providing the required electrical power. For example, the allocating unit 230 allocates, by using the method explained in regard to FIGS. 9 to 12, the station 30 and the battery 12 for providing the required electrical power. In S1410, the controlling unit 240 controls charging/discharging of the battery 12 based on the allocation result obtained in 1408 and a demand.

As explained above, according to the system 100, by taking a usage prediction on the vehicle 10 and the battery 12 into account, electrical power and electrical energy available to be provided by each battery 12 can be estimated with high accuracy. Further according to the system 100, based on the electrical power and the electrical energy available to be provided by each battery 12, a battery 12 for providing electrical power depending on a demand can be allocated, and also electrical power and electrical energy which should be provided by each battery 12 in every timeframe can be allocated to each battery 12. Conventionally, it has been uneasy to predict electrical energy available to be provided by a battery mounted on a mobile object in advance because the battery mounted on the mobile object may be disengaged from the electrical power network 90 in irregular timeframes. Therefore, it has been required to secure an extra number of auxiliary batteries in order to use batteries mounted on the mobile object for adjusting power supply and demand of the electrical power network 90. Against this, according to the control performed by the system 100 described above, it is possible to provide the electrical power network 90 with more electrical power by using a fewer number of batteries 12.

Figure 15:
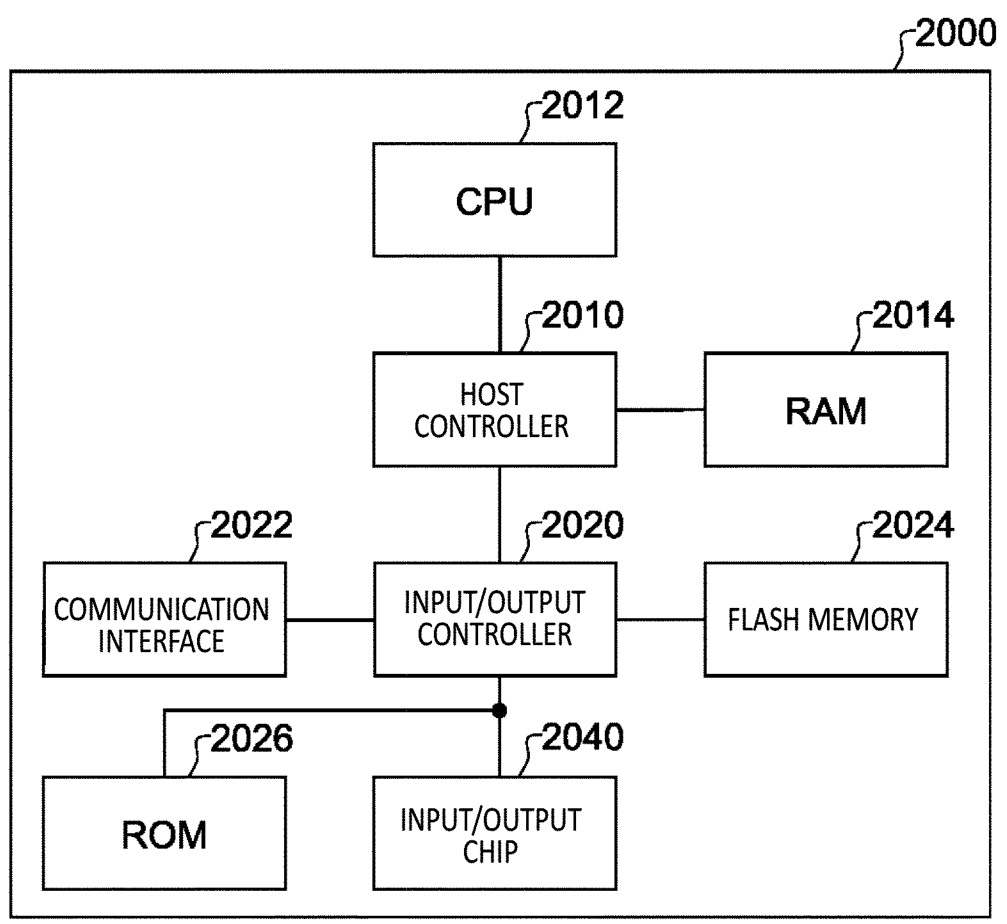
FIG. 15 illustrates an example of a computer 2000.

FIG. 15 shows an example of a computer 2000 in which multiple embodiments of the present invention can be entirely or partially embodied. A program installed in the computer 2000 can cause the computer 2000 to: function as a system or each unit of the system according to the embodiments, or a device of various types of control devices etc. or each unit of the device; execute operations associated with the system or each unit of the system, or the device or each unit of the device; and/or execute processes according to the embodiments or stages of these processes. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing written in these programs is read by the computer 2000, and provides cooperation between the programs and the various types of hardware resources described above. A device or a method may be actualized by executing operations or processing of information depending on a use of the computer 2000.

For example, when communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various types of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and write back a result into the RAM 2014. In addition, the CPU 2012 may search for information in a file, a database, or the like in the recording medium. For example, when multiple entries, each having an attribute value of a first attribute associated with an attribute value of a second attribute, is stored in the recording medium, the CPU 2012 may search for an entry having a designated attribute value of the first attribute that matches a condition from the multiple entries, and read the attribute value of the second attribute stored in the entry, thereby obtaining the attribute value of the second attribute associated with the first attribute that satisfies a predefined condition.

The programs or software modules explained above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

A program that is installed in the computer 2000 and causes the computer 2000 to function as the system 100 may work on the CPU 2012 and the like to cause the computer 2000 to function as each unit of the system 100, respectively. Information processing described in these programs is read into the computer 2000 and then functions as each unit of the system 100, which is a concrete means obtained from cooperation of software and the various types of hardware resources described above. Then, by using these concrete means for computing or processing information depending on an intended use of the computer 2000 in the present embodiment, a particular system 100 is formed depending on the intended use.

Various embodiments have been explained with reference to the block diagrams and the like. In the block diagrams, each block may represent (1) a stage of a process in which an operation is executed, or (2) each unit of the device having a role in executing the operation. A specific stage and unit may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer-readable storage medium may include any tangible device capable of storing instructions to be executed by an appropriate device. Thereby, the computer-readable storage medium having instructions stored therein forms at least a part of a product including instructions which can be executed to provide means for executing processing procedures or operations specified in the block diagrams. An example of the computer-readable storage medium may include an electronic storage medium, a magnetic storage medium, an optical storage medium, an electromagnetic storage medium, or a semiconductor storage medium. A more specific example of the computer-readable storage medium may include a floppy (registered trademark) disk, a diskette, a hard disk, a random-access memory (RAM), a read-only memory (ROM), an erasable programmable read-only memory (EPROM or flash memory), an electrically erasable programmable read-only memory (EEPROM), a static random-access memory (SRAM), a compact disc read-only memory (CD-ROM), a digital versatile disc (DVD), a Blu-ray (registered trademark) disc, a memory stick, or an integrated circuit card.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or other programmable data processing device, or to programmable circuit, locally or via a local area network (LAN), wide area network (WAN) such as the Internet, and a computer-readable instruction may be executed to provide means for executing operations specified in the explained processing procedures or block diagrams. An example of the processor includes a computer processor, processing unit, microprocessor, digital signal processor, controller, microcontroller, or the like.

While the embodiments of the present invention have been explained, the technical scope of the present invention is not limited to the above-described embodiments. It is apparent to persons skilled in the art that various alterations or improvements can be added to the above-described embodiments. It is also apparent from the description of the claims that the embodiments to which such alterations or improvements are made can also fall within the technical scope of the present invention.

The operations, procedures, steps, and stages etc. of each process performed by a device, system, program, and method shown in the claims, specification, or diagrams can be executed in any order as long as the order is not indicated by "before", "prior to", or the like and as long as the output from a previous process is not used in a later process. Even if the operation flow is explained using phrases such as "first" or "next" in the claims, specification, or drawings, it does not necessarily mean that the process must be performed in this order.

EXPLANATION OF REFERENCES

5: electrical power system; 10: vehicle; 20: vehicle; 42: private house; 44: facility; 12: battery; 30: station; 70: electrical power user; 80: electrical power generator; 90: electrical power network; 180: server; 190: communication network; 200: processing unit; 210: obtaining unit; 220: estimating unit; 230: allocating unit; 240: controlling unit; 280: storage unit; 290: communication device; 301: predicted electrical power; 302: target electrical power; 311: estimated electrical power; 331: required electrical power; 100: system; 2000: computer; 2010: host controller; 2012: CPU; 2014: RAM; 2020: input/output controller; 2022: communication interface; 2024: flash memory; 2026: ROM; 2040: input/output chip.

What is claimed is:

1. A system configured to control charging of multiple movable batteries, and power supply from the multiple movable batteries to outsides, comprising:

a controlling unit for providing an electrical power network with an electrical power resource by performing, at least one of a first control for reducing power charging amounts for the multiple movable batteries, or a second control for increasing power supplying amounts from the multiple movable batteries, in response to a first request for requesting power consumption to be reduced, and at least one of a third control for increasing power charging amounts for the multiple movable batteries, or a fourth control for reducing power supplying amounts from the multiple movable batteries to outsides, in response to a second request for requesting power consumption to be increased; and an estimating unit for estimating, based on predicted usage situations of the multiple movable batteries, which of the first control, the second control, the third control, or the fourth control can be used by each of the multiple movable batteries to provide the electrical power network with an electrical power resource, wherein the estimating unit is configured to estimate, based on the predicted usage situations of the multiple movable batteries, an amount of electrical power resources that can be provided to the electrical power network by the each of the multiple movable batteries by using each of the first control, the second control, the third control, and the fourth control, the system further comprises an allocating unit for allocating, based on an amount of electrical power resources available to be provided to the electrical power network by each movable battery, and an amount of electrical power resources required to be provided to the electrical power network, by which of the first control, second control, third control, or fourth control, each of the multiple movable batteries provides the electrical power network with the electrical power resource in each of multiple timeframes in a future, wherein the allocating unit preferentially allocate, when allocating whether each movable battery provides the electrical power network with an electrical power resource, the first control over the second control, and the fourth control over the third control.

2. The system according to claim 1, wherein the predicted usage situations of the multiple movable batteries include timeframes in which the multiple movable batteries are predicted to be used.

3. The system according to claim 2, wherein the predicted usage situations of the multiple movable batteries also include predicted charging states of the multiple movable batteries.

4. The system according to claim 2, wherein the estimating unit is configured to estimate the predicted usage situations of the multiple movable batteries based on usage histories of the multiple movable batteries in a past, and usage plans of the multiple movable batteries in a future.

5. The system according to claim 1, wherein the predicted usage situations of the multiple movable batteries include timings at which the multiple movable batteries are predicted to be charged or discharged; and the estimating unit is configured to estimate, for the timings at which the multiple movable batteries are predicted to be charged or discharged in a period in which an electrical power resource contracted in an electricity market should be provided to the electrical power network, an amount of electrical power resources available to be provided to the electrical power network by changing timings of charging or discharging the multiple movable batteries, and thereby estimates an amount of electrical power resources that can be provided to the electrical power network by the each of the multiple movable batteries by using each of the first control, the second control, the third control and the fourth control.

6. The system according to claim 5, wherein the controlling unit is configured to perform:

at least one of the first control or the second control, in response to the first request being received within the period in which the electrical power resource should be provided to the electrical power network and based on the amount of electrical power resources estimated by the estimating unit as being available to be provided to the electrical power network; and at least one of the third control or the fourth control, in response to the second request being received within the period in which the electrical power resource should be provided to the electrical power network and based on the amount of electrical power resources estimated by the estimating unit as being available to be provided to the electrical power network.

7. The system according to claim 1, wherein the multiple movable batteries include batteries mounted on vehicles.

8. The system according to claim 7, wherein the multiple movable batteries include batteries that are mounted on the vehicles and exchangeable at multiple stations.

9. The system according to claim 1, wherein the predicted usage situations of the multiple movable batteries also include predicted charging states of the multiple movable batteries.

10. The system according to claim 3, wherein the estimating unit is configured to estimate the predicted usage situations of the multiple movable batteries based on usage histories of the multiple movable batteries in a past, and usage plans of the multiple movable batteries in a future.

11. The system according to claim 1, wherein the estimating unit is configured to estimate the predicted usage situations of the multiple movable batteries based on usage histories of the multiple movable batteries in a past, and usage plans of the multiple movable batteries in a future.

12. The system according to claim 9, wherein the estimating unit is configured to estimate the predicted usage situations of the multiple movable batteries based on usage histories of the multiple movable batteries in a past, and usage plans of the multiple movable batteries in a future.

13. The system according to claim 2, wherein the multiple movable batteries include batteries mounted on vehicles.

14. The system according to claim 3, wherein the multiple movable batteries include batteries mounted on vehicles.

15. The system according to claim 4, wherein the multiple movable batteries include batteries mounted on vehicles.

16. The system according to claim 1, further comprising:

an obtaining unit configured to obtain preference information representing whether a user of a vehicle prefers that the movable battery provides electrical power in response to the request, wherein the estimating unit is configured to exclude a movable battery of the vehicle associated with the user who does not prefer that the movable battery provides electrical power in response to the request, from the movable batteries for responding to the demand.

17. A non-transitory computer-readable storage medium having stored thereon a program, wherein the program causes a computer for controlling charging of multiple movable batteries, and power supply from the multiple movable batteries to outsides to function as:

a controlling unit for providing an electrical power network with an electrical power resource by performing, at least one of a first control for reducing power charging amounts for the multiple movable batteries, or a second control for increasing power supplying amounts from the multiple movable batteries, in response to a first request for requesting power consumption to be reduced, and at least one of a third control for increasing power charging amounts for the multiple movable batteries, or a fourth control for reducing power supplying amounts from the multiple movable batteries to outsides, in response to a second request for requesting power consumption to be increased; and an estimating unit for estimating, based on predicted usage situations of the multiple movable batteries, which of the first control, the second control, the third control, or the fourth control can be used by each of the multiple movable batteries to provide the electrical power network with an electrical power resource, wherein the estimating unit is configured to estimate, based on the predicted usage situations of the multiple movable batteries, an amount of electrical power resources that can be provided to the electrical power network by the each of the multiple movable batteries by using each of the first control, the second control, the third control, and the fourth control, the program further causes the computer to function as:

an allocating unit for allocating, based on an amount of electrical power resources available to be provided to the electrical power network by each movable battery, and an amount of electrical power resources required to be provided to the electrical power network, by which of the first control, second control, third control, or fourth control, each of the multiple movable batteries provides the electrical power network with the electrical power resource in each of multiple timeframes in a future, wherein the allocating unit preferentially allocate, when allocating whether each movable battery provides the electrical power network with an electrical power resource, the first control over the second control, and the fourth control over the third control.

18. A method, comprising:

providing an electrical power network with an electrical power resource by performing, at least one of a first control for reducing power charging amounts for multiple movable batteries, or a second control for increasing power supplying amounts from the multiple movable batteries, in response to a first request for requesting power consumption to be reduced, and at least one of a third control for increasing power charging amounts for the multiple movable batteries, or a fourth control for reducing power supplying amounts from the multiple movable batteries to outsides, in response to a second request for requesting power consumption to be increased; and estimating, based on predicted usage situations of the multiple movable batteries, which of the first control, the second control, the third control, or the fourth control can be used by each of the multiple movable batteries to provide the electrical power network with an electrical power resource, wherein the estimating includes estimating, based on the predicted usage situations of the multiple movable batteries, an amount of electrical power resources that can be provided to the electrical power network by the each of the multiple movable batteries by using each of the first control, the second control, the third control, and the fourth control, the method further comprises allocating, based on an amount of electrical power resources available to be provided to the electrical power network by each movable battery, and an amount of electrical power resources required to be provided to the electrical power network, by which of the first control, second control, third control, or fourth control, each of the multiple movable batteries provides the electrical power network with the electrical power resource in each of multiple timeframes in a future, wherein the allocating includes preferentially allocating, when allocating whether each movable battery provides the electrical power network with an electrical power resource, the first control over the second control, and the fourth control over the third control.

* * * * *